(12) United States Patent
Zhu et al.

(10) Patent No.: US 12,349,137 B2
(45) Date of Patent: Jul. 1, 2025

(54) DATA MULTIPLEXING TRANSMISSION METHOD, BASE STATION, TERMINAL, AND STORAGE MEDIUM

(71) Applicant: CHINA TELECOM CORPORATION LIMITED, Beijing (CN)

(72) Inventors: Jianchi Zhu, Beijing (CN); Xiaoming She, Beijing (CN); Peng Chen, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 358 days.

(21) Appl. No.: 17/595,730

(22) PCT Filed: May 22, 2020

(86) PCT No.: PCT/CN2020/091815
§ 371 (c)(1),
(2) Date: Nov. 23, 2021

(87) PCT Pub. No.: WO2020/238797
PCT Pub. Date: Dec. 3, 2020

(65) Prior Publication Data
US 2022/0256523 A1 Aug. 11, 2022

(30) Foreign Application Priority Data
May 30, 2019 (CN) .......................... 201910459690.X

(51) Int. Cl.
H04W 72/20 (2023.01)
(52) U.S. Cl.
CPC .................................. H04W 72/20 (2023.01)

(58) Field of Classification Search
None
See application file for complete search history.

(56) References Cited

U.S. PATENT DOCUMENTS

2017/0290004 A1\* 10/2017 Yang ..................... H04L 5/0092
2018/0035332 A1 2/2018 Agiwal
(Continued)

FOREIGN PATENT DOCUMENTS

| CN | 109429349 | 3/2019 |
|---|---|---|
| CN | 109618362 | 4/2019 |

(Continued)

OTHER PUBLICATIONS

Fujitsu, "On eMBB and URLLC Multiplexing for Uplink" dated Aug. 21-25, 2017, Doc Code R1-1712747 (Year: 2017).\*
(Continued)

*Primary Examiner* — Jamaal Henson
(74) *Attorney, Agent, or Firm* — Andrew M. Calderon; Calderon Safran & Wright P.C.

(57) ABSTRACT

Disclosed are a data multiplexing transmission method, a base station, a terminal, and a storage medium. The method comprises: a base station sends service resource occupation information corresponding to a first terminal by means of a control channel, so that a second terminal performs data transmission processing on the basis of the service resource occupation information when detecting the service resource occupation information sent on the control channel. The method, base station, terminal, and storage medium provided by the present application provide a resource multiplexing solution, solve the problem of service resource overlaps between different users, and improve the utilization efficiency of uplink transmission resources.

10 Claims, 4 Drawing Sheets

(56) References Cited

U.S. PATENT DOCUMENTS

| | | | | |
|---|---|---|---|---|
| 2018/0035459 | A1* | 2/2018 | Islam | H04L 5/0053 |
| 2018/0054285 | A1* | 2/2018 | Chen | H04L 1/1893 |
| 2018/0184468 | A1* | 6/2018 | Chien | H04W 72/30 |
| 2019/0045546 | A1 | 2/2019 | Li | |
| 2019/0081741 | A1 | 3/2019 | Al-Imari | |
| 2019/0104536 | A1 | 4/2019 | Wang | |
| 2020/0008216 | A1* | 1/2020 | Iyer | H04W 72/23 |
| 2020/0015119 | A1* | 1/2020 | Takeda | H04L 1/1864 |
| 2020/0022160 | A1* | 1/2020 | Zou | H04W 72/1268 |
| 2020/0328866 | A1* | 10/2020 | Du | H04L 5/0096 |
| 2021/0126753 | A1* | 4/2021 | Mochizuki | H04W 72/542 |
| 2021/0314981 | A1* | 10/2021 | Liang | H04W 72/23 |

FOREIGN PATENT DOCUMENTS

| | | |
|---|---|---|
| CN | 109673050 | 4/2019 |
| EP | 3621366 A1 | 3/2020 |
| WO | 2018008981 A1 | 1/2018 |
| WO | 2018028076 | 2/2018 |
| WO | 2018137566 | 8/2018 |
| WO | 2018173208 A1 | 9/2018 |
| WO | 2019028751 | 2/2019 |
| WO | 2019028762 A1 | 2/2019 |
| WO | 2019050381 | 3/2019 |
| WO | 2019098059 | 5/2019 |

OTHER PUBLICATIONS

Supplemental European Search Report received in European Patent Applicatio No. 20814839, dated Dec. 18, 2022.

VIVO : "Discussion on handling UL multiplexing of .transmissions with.different reliability requirements", 3GPP Draft; RI-1801550_Discussion on handling UL multiplexing of transmission with different reliability requirements, 3rd Generation Partnership Project (3GPP), vol. RAN WGI, No. Athens, Greece; Feb. 26, 2018-Mar. 2, 2018 Feb. 15, 2018, XP051396802, Retrieved from the Internet: http: //www.3gpp.org/ftp/tsg%5Fran/WG1%5FRL1/TSGR1%5F92/Docs/.

VIVO: "UL inter-UE Tx prioritization for URLLC", 3GPP Draft; RI-1812318_UL Inter UE Tx Prioritixsation for URLLC, 3rd Generation Partnership Project (3GPP), vol. RAN WGI , No. Spokane, USA; Nov. 12, 2018-Nov. 16, 2018, Nov. 3, 2018, XP051478507, Retrieved from the Internet: http: //www.3gpp.org/ftp/tsg%5Fran/WG1%5FRL1/TSGR1%5F95/Docs/R1%2DI812318%2Ezip.

3GPP TSG RAN WG1 #97, 'UL inter-UE multiplexing between eBB and URLLC', R1-1906413, ZTE, Reno, USA, May 13-17, 2019.

3GPP TSG RAN WG1 Meeting #92bis, "Uplink Pre-emption for URLLC Reliability", R1-1804450, Institute for Information Industry (III), Sanya, China, Apr. 16-20, 2018.

3GPP TSG-RAN WG! #92b, "eMBB and URLLC dynamic multiplexing and preemption indication on the up", Qualcomm Incorporation, Sanya, China, Apr. 16-20, 2018.

Office Action received in CN201910459690.X, dated Aug. 9, 2022.

Decision of Rejection received in CN20191045960.X, dated Jun. 21, 2023, 13 pages.

Office Action for Japan Application No. 2021-570927 dated Nov. 26, 2024 with English Translation, 7 pages.

First Office Action recived in the related Japanese Patent Application No. 2021-570927, dated May 14, 2024.

Ericsson, Inter-UE Prioritization and Multiplexing of UL Transmissions [online], 3GPP TSG RAN WG1 #94 R1-1808148, Internet URL:http://www.3gpp.org/ftp/tsg_ran/WG1_RL1/TSGR1_94/Docs/R1-1808148.zip.

Fujitsu, On eMMB and URLL Multiplexing [online], 3GPP TSG RAN WG1 #91 R1-1719616, Internet URL:http://www.3gpp.org/ftp/tsg_ran/WG1_RL1/TSGR1_91/Docs/R1-1719616.zip, Nov. 2017.

Fujitsu, 'On eMMB and URLL Multiplexing', Discussion and decision, 3GPP TSG RAN WG1 Meeting #90bis, R1-1717722, Prague, Czech Republic, Oct. 9-13, 2017.

* cited by examiner

DATA MULTIPLEXING TRANSMISSION METHOD, BASE STATION, TERMINAL, AND STORAGE MEDIUM

CROSS-REFERENCE TO RELATED APPLICATIONS

This application is the U.S. National Phase of International Patent Application No. PCT/CN2020/091815, filed May 22, 2020, which claims the priority to the Chinese patent application No. 201910459690.X filed on May 30, 2019, the disclosure of which is hereby incorporated by reference in its entirety into the present application.

TECHNICAL FIELD

The present disclosure relates to the technical field of communications, and particularly, to a data multiplexing transmission method, a base station, a terminal, and a storage medium.

BACKGROUND

In the 5G (5th-Generation Mobile Communication Technology) communication technology standard, three major types of application scenarios are included: Enhanced Mobile Broadband (eMBB) scenario, Ultra-reliable and Low Latency Communication (URLLC) scenario, and Massive Machine Type of Communication (mMTC) scenario. In the URLLC scenario, services such as Internet of Vehicles, industrial control, telemedicine and the like make higher requirements on latency and reliability. The 3GPP standardization proposes that an eMBB service and a URLLC service can dynamically share resources. There are two cases of dynamical sharing of resources by the eMBB service and the URLLC service: dynamical sharing of resources by the eMBB service and the URLLC service of a same user, and dynamical sharing of resources by the eMBB service and the URLLC service of different users. An eMBB resource takes a slot as a basic unit, and its bandwidth and subcarrier interval are narrower than those of a URLLC resource. The URLLC resource takes a symbol as a basic unit (such as 2, 4 and 7 symbols), and its bandwidth and subcarrier interval are wider than those of the eMBB resource.

SUMMARY

The present disclosure provides a data multiplexing transmission method, a base station, a terminal and a storage medium.

According to a first aspect of the present disclosure, there is provided a data transmission method comprising: sending, by a base station, service resource occupation information corresponding to a first terminal through a control channel, so that a second terminal performs, when detecting the service resource occupation information sent on the control channel, data transmission processing based on the service resource occupation information.

In some embodiments, the sending, by a base station, service resource occupation information corresponding to a first terminal through a control channel comprises: broadcasting, by the base station, a control command through the control channel; wherein the control command carries the service resource occupation information.

In some embodiments, the service resource occupation information comprises: ultra-reliable and low latency communication (URLLC) service resource occupation information; the base station receiving a URLLC service request sent by the first terminal and allocating resources occupied by transmission of the URLLC service for the first terminal; and the base station generating the control command and broadcasting it through the control channel, wherein the control command carries the URLLC service resource occupation information corresponding to the resources occupied by the transmission of the URLLC service.

In some embodiments, the data transmission processing comprises: enhanced mobile broadband (eMBB) uplink data transmission processing; and before receiving the URLLC service request, the base station allocating time-frequency resources for transmitting the eMBB uplink data for the second terminal and sending allocated time-frequency resource information to the second terminal.

In some embodiments, the base station generates bitmap information identifying the resources occupied by the transmission of the URLLC service; and the base station generates the URLLC service resource occupation information, wherein the URLLC service resource occupation information has therein carried the bitmap information.

In some embodiments, the generating, by the base station, bitmap information identifying the resources occupied by the transmission of the URLLC service comprises: the base station obtaining all the resources required to be occupied for transmitting the URLLC service, generating one bit for each resource correspondingly, and generating the bitmap information based on the bits.

In some embodiments, the number of bits contained in the bitmap information is equal to the number of all the resources required to be occupied for transmitting the URLLC service; wherein the resource comprises: at least one of a PRB, a PRB group, a subcarrier, a sequence, a codeword, a symbol and a time slot.

In some embodiments, the control channel comprises: a group common physical downlink control channel (Group common PDCCH); and the control command comprises: a Group common PDCCH control command.

According to a second aspect of the present disclosure, there is provided a data transmission method comprising: a second terminal detecting service resource occupation information corresponding to a first terminal sent by a base station through a control channel; and when detecting the service resource occupation information sent on the control channel, the second terminal performing data transmission processing based on the service resource occupation information.

In some embodiments, the service resource occupation information comprises: ultra-high reliable and low latency communication (URLLC) service resource occupation information; the second terminal detecting a control command broadcast by the base station through the control channel; wherein the control command carries the URLLC service resource occupation information.

In some embodiments, the data transmission processing comprises: enhanced mobile broadband (eMBB) uplink data transmission processing; and the second terminal performing data transmission processing, based on the URLLC service resource occupation information comprises: the second terminal judging whether time-frequency resources for transmitting the eMBB uplink data overlap with time-frequency resources corresponding to the URLLC service resource occupation information based on the URLLC service resource occupation information; and if so, the second terminal cancelling transmitting the eMBB uplink data, and if not, the second terminal continuing transmitting the eMBB uplink data.

In some embodiments, the URLLC service resource occupation information has therein carried bitmap information identifying resources occupied by the first terminal for transmitting the URLLC service, wherein each resource corresponds to one bit.

In some embodiments, the number of bits contained in the bitmap information is equal to the number of all the resources required to be occupied for transmitting the URLLC service; wherein the resource comprises: at least one of a PRB, a PRB group, a subcarrier, a sequence, a codeword, a symbol, a time slot.

In some embodiments, the control channel comprises: a group common physical downlink control channel (Group common PDCCH); and the control command comprises: a Group common PDCCH control command.

According to a third aspect of the present disclosure, there is provided a base station comprising: an information sending module configured to send service resource occupation information corresponding to a first terminal through a control channel, so that a second terminal performs, when detecting the service resource occupation information sent on the control channel, data transmission processing based on the service resource occupation information.

In some embodiments, the information sending module is further configured to broadcast a control command through the control channel; wherein the control command carries the service resource occupation information.

In some embodiments, the service resource occupation information comprises: ultra-high reliable and low latency communication (URLLC) service resource occupation information; a request receiving module configured to receive a URLLC service request sent by the first terminal; a resource allocation module configured to allocate resources occupied by the transmission of the URLLC service for the first terminal; and the information sending module configured to generate the control command and broadcast it through the control channel, wherein the control command carries the URLLC service resource occupation information corresponding to the resources occupied by the transmission of the URLLC service.

In some embodiments, the data transmission processing comprises: enhanced mobile broadband (eMBB) uplink data transmission processing; and the resource allocation module is further configured to allocate, before receiving the URLLC service request, time-frequency resources for transmitting the eMBB uplink data for the second terminal, and send allocated time-frequency resource information to the second terminal.

In some embodiments, an information generation module is configured to generate bitmap information identifying the resources occupied by the transmission of the URLLC service; and generate the URLLC service resource occupation information, wherein the URLLC service resource occupation information has therein carried the bitmap information.

In some embodiments, the information generation module is further configured to obtain all the resources required to be occupied for transmitting the URLLC service, generate one bit for each resource correspondingly, and generate the bitmap information based on the bits.

In some embodiments, the number of bits contained in the bitmap information is equal to the number of all the resources required to be occupied for transmitting the URLLC service; wherein the resource comprises: at least one of a PRB, a PRB group, a subcarrier, a sequence, a codeword, a symbol, a time slot.

In some embodiments, the control channel comprises: a group common physical downlink control channel (Group common PDCCH); and the control command comprises: a Group common PDCCH control command.

According to a fourth aspect of the present disclosure, there is provided a terminal comprising: an information detecting module configured to detect service resource occupation information corresponding to another terminal sent by a base station through the control channel; and a transmission processing module configured to perform, when detecting the service resource occupation information sent on the control channel, data transmission processing based on the service resource occupation information.

In some embodiments, the service resource occupation information comprises: ultra-high reliable and low latency communication (URLLC) service resource occupation information; and the information detecting module is configured to monitor a control command broadcast by the base station through the control channel; wherein the control command carries the URLLC service resource occupation information.

In some embodiments, the data transmission processing comprises: enhanced mobile broadband (eMBB) uplink data transmission processing; and the transmission processing module is configured to judge whether time-frequency resources for transmitting the eMMC uplink data overlap with time-frequency resources corresponding to the URLLC service resource occupation information based on the URLLC service resource occupation information; and if so, cancel transmitting the eMBB uplink data, and if not, continue transmitting the eMBB uplink data.

In some embodiments, the URLLC service resource occupation information has therein carried bitmap information identifying resources occupied by the other terminal for transmitting the URLLC service, wherein each resource corresponds to one bit.

In some embodiments, the number of bits contained in the bitmap information is equal to the number of all the resources required to be occupied for transmitting the URLLC service; wherein the resource comprises: at least one of a PRB, a PRB group, a subcarrier, a sequence, a codeword, a symbol, a time slot.

In some embodiments, the control channel comprises: a group common physical downlink control channel (Group common PDCCH); and the control command comprises: a Group common PDCCH control command.

According to a fifth aspect of the present disclosure, there is provided a base station comprising: a memory; and a processor coupled to the memory, which is configured to perform, based on instructions stored in the memory, the method as described above.

According to a sixth aspect of the present disclosure, there is provided a terminal comprising: a memory; and a processor coupled to the memory, which is configured to perform, based on instructions stored in the memory, the method as described above.

According to a seventh aspect of the present disclosure, there is provided a computer-readable storage medium having thereon stored computer instructions which, when executed by a processor, implement the method as described above.

BRIEF DESCRIPTION OF THE DRAWINGS

In order to more clearly illustrate embodiments of the present disclosure or technical solutions in related arts, the accompanying drawings used in the description of the embodiments or related arts will be briefly introduced below. It is obvious that the drawings in the description below are only some of the embodiments of the present disclosure, and for those of ordinary skill in the art, other drawings can also be obtained according to these drawings without making any creative effort.

DETAILED DESCRIPTION

The present disclosure will be described more fully hereinafter with reference to the accompanying drawings, in which exemplary embodiments of the present disclosure are shown. Technical solutions in the embodiments of the present disclosure will be described clearly and completely in conjunction with the drawings in the embodiments of the present disclosure, and it is obvious that the embodiments described are only some of the embodiments of the present disclosure, rather than all of them. All other embodiments, which can be derived by those of ordinary skill in the art from the embodiments disclosed herein without making any creative effort, shall fall within the protection scope of the present disclosure. The technical solutions of the present disclosure will described in various aspects below in conjunction with various drawings and embodiments.

Words "first", "second", etc. are used hereinafter only for descriptive distinction and have no other special meanings.

In the related art known to inventors, the eMBB service and the URLLC service can dynamically share resources, but the related art has at least the following disadvantages: when the eMBB service and the URLLC service of different users dynamically share resources, the base station allocates one resource with a long duration and a narrow bandwidth to the eMB service of a first user; afterwards, a second user wants to send the URLLC service, and the base station allocates one resource with a short duration and a wide bandwidth to the second user; the URLLC resource of the second user overlaps with the eMBB resource of the first user.

In view of this, the embodiments of the present disclosure provide a data multiplexing transmission method, a base station, a terminal, and a storage medium, the base station sending service resource occupation information corresponding to a first terminal through a control channel, a second terminal performing data transmission processing according to the detected service resource occupation information, which provides a resource multiplexing solution, solves a overlap between resources of different users, and improves utilization efficiency of uplink transmission resources.

Figure 1:
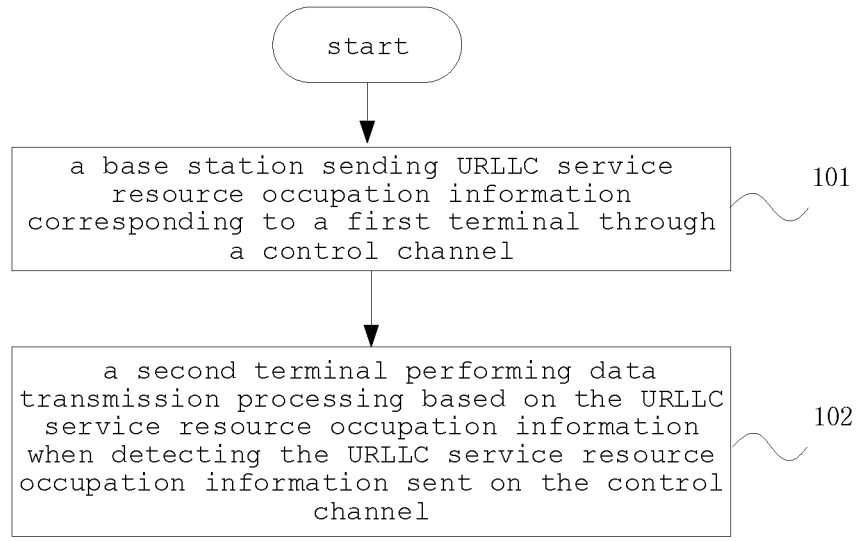
FIG. 1 is a schematic flowchart of a data multiplexing transmission method according to some embodiments of the present disclosure.

FIG. 1 is a schematic flowchart of a data multiplexing transmission method according to some embodiments of the present disclosure, and as shown in FIG. 1:

Step 101, a base station sending URLLC service resource occupation information corresponding to a first terminal through a control channel.

Step 102, a second terminal performing data transmission processing based on the URLLC service resource occupation information when detecting the URLLC service resource occupation information sent on the control channel.

The eMBB uplink data refers to eMBB service data sent by the terminal to the base station, and the eMBB service can be services such as video. The URLLC uplink data refers to URLLC service data sent by the terminal to the base station, and the URLLC service can be services such as automatic driving. The first terminal and the second terminal support transmission and reception of data in eMBB and URLLC modes, and can be smart phones, tablet computers, etc.

In some embodiments, the base station can send the URLLC service resource occupation information corresponding to the first terminal through the control channel in a variety of ways. For example, the base station broadcasts a control command through a control channel, and the control command carries the URLLC service resource occupation information. The control channel can be various, for example, a group common physical downlink control channel (Group common PDCCH), etc., and the control command can be various, for example, a Group common PDCCH control command, etc.

In a 5G new radio (NR) system, a system bandwidth can be divided into multiple carrier components (CCs), and on each CC, a network device separately transmits a group common physical downlink control channel (PDCCH) corresponding to each CC to user equipment (UE). The group common PDCCH is used for indicating common information of UE included in a UE group, and all UEs under the base station can constitute one UE group.

The second terminal judges whether time-frequency resources for transmitting the eMMC uplink data overlap with time-frequency resources corresponding to the URLLC service resource occupation information based on the URLLC service resource occupation information; and if so, the second terminal cancels transmitting the eMBB uplink data, and if not, the second terminal continues transmitting the eMBB uplink data.

In some embodiments, before receiving a URLLC service request, the base station separately allocates time-frequency resources for transmitting the eMBB uplink data for the first terminal and the second terminal, and separately sends allocated time-frequency resource information to the first terminal and the second terminal. The base station schedules the resources used by the eMBB uplink data for the first terminal and the second terminal, and schedules resources used by the URLLC uplink data for the first terminal when the first terminal needs to upload the URLLC service data. The base station receives a URLLC service request sent by the first terminal and allocates resources occupied by the transmission of the URLLC service for the first terminal.

Time-frequency resources used by the eMBB service and the URLLC service are indicated by the base station through a PDCCH control command, and in the PDCCH control command is provided a special bit to carry resource allocation information. The eMBB time-frequency resource refers to a time-frequency resource which is allocated to the terminal by the base station for transmitting the eMBB uplink service data, and an eMBB time-frequency resource unit refers to an unit of the eMBB time-frequency resource. The base station allocates eMBB time-frequency resources for transmitting eMBB uplink data for the terminal and determines a time domain starting position of resource mapping.

The terminal determines available eMBB time-frequency resource units according to the time domain starting position of the resource mapping, and sequentially maps data symbols of the eMBB service data to the available eMBB time-frequency resource units from the time domain starting position of the resource mapping. The terminal can transmit the URLLC uplink data on the occupied eMBB time-frequency resource units, and determine one or more symbols s allocated to a time slot t of the terminal as the occupied eMBB time-frequency resource units allocated to the URLLC uplink data.

Figure 2:
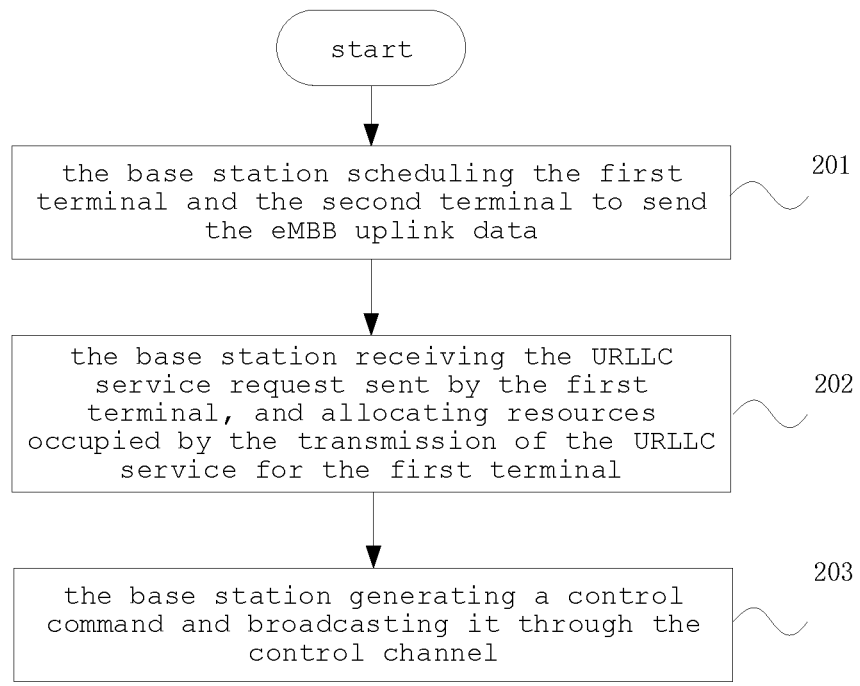
FIG. 2 is a schematic flowchart of broadcasting a control command in a data multiplexing transmission method according to some embodiments of the present disclosure.

FIG. 2 is a schematic flowchart of broadcasting a control command in a data multiplexing transmission method according to some embodiments of the present disclosure, and as shown in FIG. 2:

Step 201, the base station scheduling the first terminal and the second terminal to send the eMBB uplink data.

Step 202, the base station receiving the URLLC service request sent by the first terminal, and allocating resources occupied by the transmission of the URLLC service for the first terminal.

Step 203, the base station generating a control command and broadcasting it through the control channel, wherein the control command carries the URLLC service resource occupation information corresponding to the resources occupied by the transmission of the URLLC service.

The base station generates bitmap information identifying the resources occupied by the transmission of the URLLC service, and the base station generates the URLLC service resource occupation information, wherein the URLLC service resource occupation information has therein carried the bit map information.

In the process that the base station generates the bitmap information identifying the resources occupied by the transmission of the URLLC service, the base station obtains all the resources required to be occupied for transmitting the URLLC service, generates one bit for each resource correspondingly, and generates the bitmap information based on the bits. The number of bits contained in the bitmap information is equal to the number of all the resources required to be occupied for transmitting the URLLC service, and the resource comprises: at least one of a PRB, a PRB group, a subcarrier, a sequence, a codeword, a symbol, a time slot.

The base station can broadcast the resources occupied for transmitting the URLLC through the Group common PDCCH, the base station can inform the state of the resource through the bitmap, and each 1 bit in the bitmap corresponds to 1 resource and represents occupied and idle. The resource can be 1 PRB, 1 PRB group, 1 subcarrier, 1 sequence, or 1 codeword, etc. The eMBB user detects the Group common PDCCH, and when the user detects to the Group common PDCCH, the eMBB user decides whether to cancel sending the eMBB according to the resource state indicated by the signaling.

Figure 3:
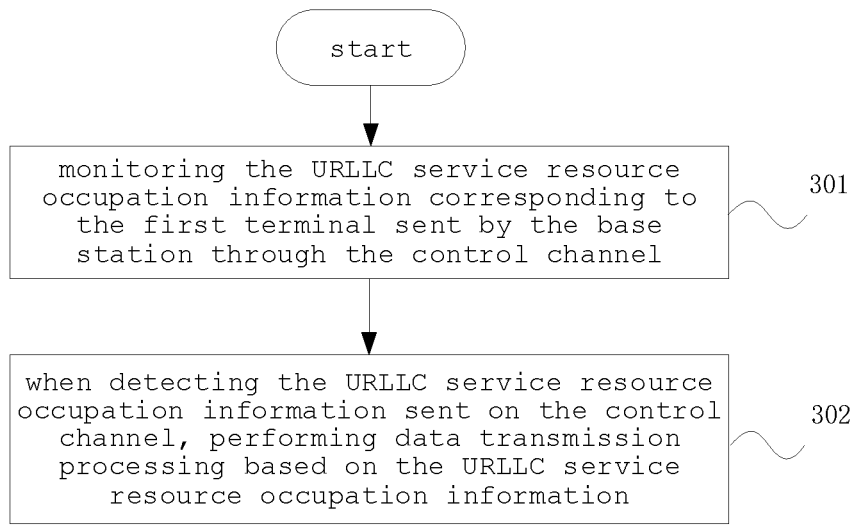
FIG. 3 is a schematic flowchart of a data multiplexing transmission method according to other embodiments of the present disclosure.

FIG. 3 is a flowchart of a data multiplexing transmission method according to other embodiments of the present disclosure, which is used for a second terminal, and as shown in FIG. 3:

Step 301, detecting the URLLC service resource occupation information corresponding to the first terminal sent by the base station through the control channel.

Step 302, when detecting the URLLC service resource occupation information sent on the control channel, performing data transmission processing based on the URLLC service resource occupation information.

The control command broadcast by the base station through the control channel is detected, and the control command carries the URLLC service resource occupation information. There are various ways to perform data transmission processing based on the URLLC service resource occupation information.

Figure 4:
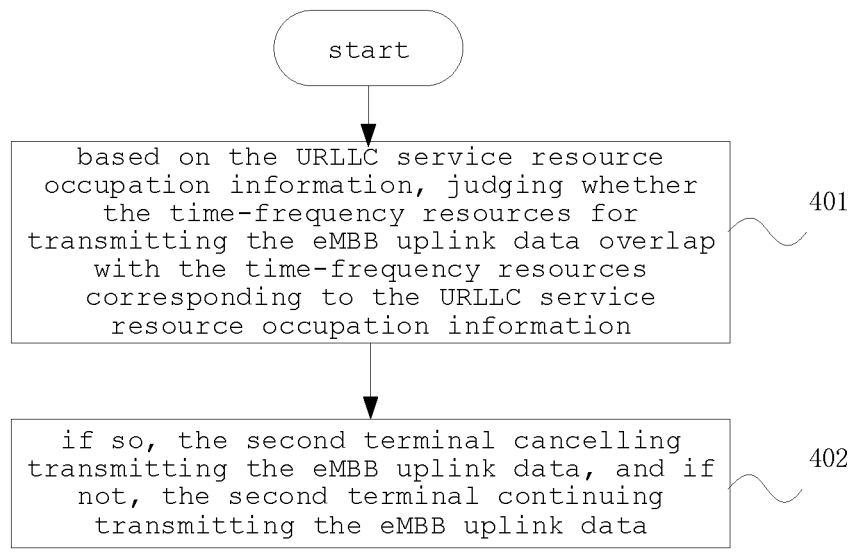
FIG. 4 is a schematic flowchart of processing transmission data in a data multiplexing transmission method according to other embodiments of the present disclosure.

FIG. 4 is a schematic flowchart of processing transmission data in a data multiplexing transmission method according to other embodiments of the present disclosure, and as shown in FIG. 4:

Step 401, based on the URLLC service resource occupation information, judging whether the time-frequency resources for transmitting the eMBB uplink data overlap with the time-frequency resources corresponding to the URLLC service resource occupation information.

Step 402, if so, the second terminal cancelling transmitting the eMBB uplink data, and if not, the second terminal continuing transmitting the eMBB uplink data.

The URLLC service resource occupation information has therein carried the bitmap information identifying the resources occupied by the first terminal for transmitting the URLLC service, and each resource corresponds to one bit. The number of bits contained in the bitmap information is equal to the number of all the resources required to be occupied for transmitting the URLLC service, and the resource comprises: at least one of a PRB, a PRB group, a subcarrier, a sequence, a codeword, a symbol, a time slot.

In some embodiments, the base station schedules an eMBB user to send uplink data, and when there is a URLLC service request, the base station schedules a URLLC user to send uplink data. The base station broadcasts resources occupied by transmission of the URLLC through a Group common PDCCH. The eMBB user detects the Group common PDCCH, and when having detected the Group common PDCCH, the user reads a resource indication in the Group common PDCCH. If the user finds that resources occupied by the eMBB data overlap with the resources indicated by the Group common PDCCH, the user cancels transmitting the eMBB data, otherwise, the user continues transmitting the eMBB data.

Figure 5:
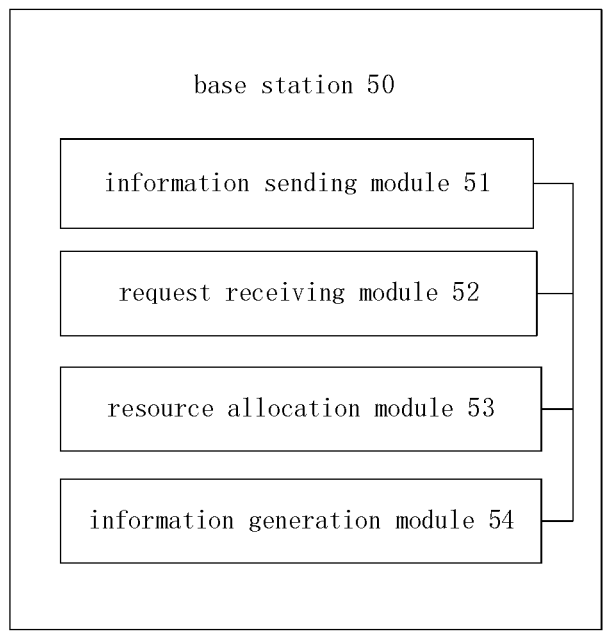
FIG. 5 is a schematic block diagram of abase station according to some embodiments of the present disclosure.

In some embodiments, as shown in FIG. 5, the present disclosure provides a base station 50 comprising: an information sending module 51, a request receiving module 52, a resource allocation module 53 and an information generation module 54.

The information sending module 51 sends the URLLC service resource occupation information corresponding to the first terminal through the control channel, so that the second terminal performs, when detecting the URLLC service resource occupation information sent on the control channel, data transmission processing based on the URLLC service resource occupation information. The information sending module 51 can broadcast the control command through the control channel; wherein the control command carries the URLLC service resource occupation information. Before receiving the URLLC service request, the resource allocation module 53 separately allocates the time-frequency resources for transmitting the eMBB uplink data for the first terminal and the second terminal, and separately sends the allocated time-frequency resource information to the first terminal and the second terminal.

The request receiving module 52 receives the URLLC service request sent by the first terminal; and the resource allocation module 53 allocates the resources occupied by the transmission of the URLLC service for the first terminal. The information sending module 51 generates the control command and broadcasts it through the control channel, wherein the control command carries the URLLC service resource occupation information corresponding to the resources occupied by the transmission of the URLLC service. The control channel comprises a group common physical downlink control channel (Group common PDCCH) and the like; and the control command comprises a Group common PDCCH control command and the like.

The information generation module 54 generates the bitmap information identifying the resources occupied by the transmission of the URLLC service; and generates the URLLC service resource occupation information, wherein the URLLC service resource occupation information has therein carried the bitmap information. The information generation module 54 can obtain all the resources occupied by the transmission of the URLLC service, generate one bit for each resource correspondingly, and generate the bitmap information based on the bits. The number of bits contained in the bitmap information is equal to the number of all the resources required to be occupied for transmitting the URLLC service, and the resource comprises: at least one of a PRB, a PRB group, a subcarrier, a sequence, a codeword, a symbol, a time slot.

Figure 6:
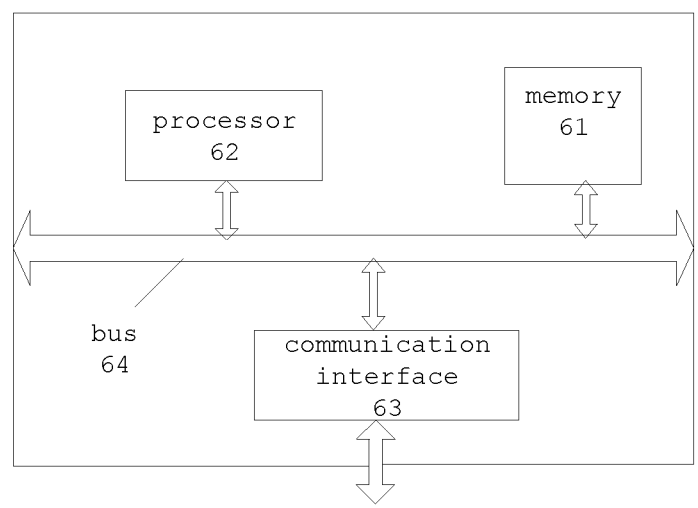
FIG. 6 is a schematic block diagram of abase station according to other embodiments of the present disclosure.

FIG. 6 is a schematic block diagram of a base station according to other embodiments of the present disclosure. As shown in FIG. 6, the apparatus can comprise a memory 61, a processor 62, a communication interface 63, and a bus 64. The memory 61 is configured to store instructions, the processor 62 is coupled to the memory 61, and the processor 62 is configured to implement, based on the instructions stored in the memory 61, the data multiplexing transmission method described above.

The memory 61 can be a high-speed RAM memory, a non-volatile memory, or the like, and the memory 61 can also be a memory array. The storage 61 may also be partitioned into blocks, and the blocks can be combined into virtual volumes according to a certain rule. The processor 62 can be a central processing unit (CPU), or an ASIC (Application Specific Integrated circuit), or one or more integrated circuits configured to implement the data multiplexing transmission method of the present disclosure.

Figure 7:
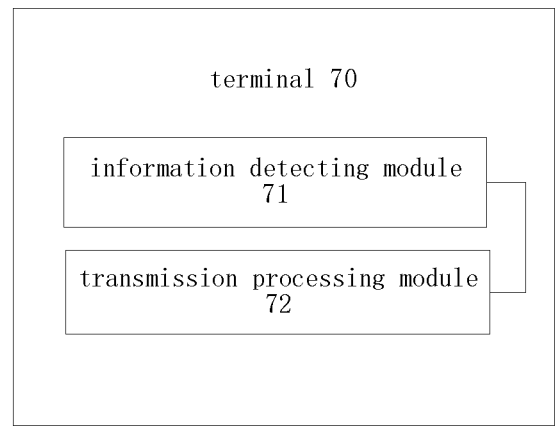
FIG. 7 is a schematic block diagram of a terminal according to some embodiments of the present disclosure.

In some embodiments, as shown in FIG. 7, the present disclosure provides a terminal 70 that can be configured as a second terminal, and another terminal can be a first terminal. The terminal 70 comprises: an information detecting module 71 and a transmission processing module 72. The information detecting module 71 listens to the URLLC service resource occupation information corresponding to the first terminal sent by the base station through the control channel, and the transmission processing module 72 performs data transmission processing based on the URLLC service resource occupation information when detecting the URLLC service resource occupation information sent on the control channel.

The information listening module 71 listens to the control command broadcast by the base station through the control channel, wherein the control command carries the URLLC service resource occupation information. The transmission processing module 72 judges whether the time-frequency resources for transmitting the eMMC uplink data overlap with the time-frequency resources corresponding to the URLLC service resource occupation information based on the URLLC service resource occupation information, if so, it cancels transmitting the eMMC uplink data, and if not, it continues transmitting the eMMC uplink data.

Figure 8:
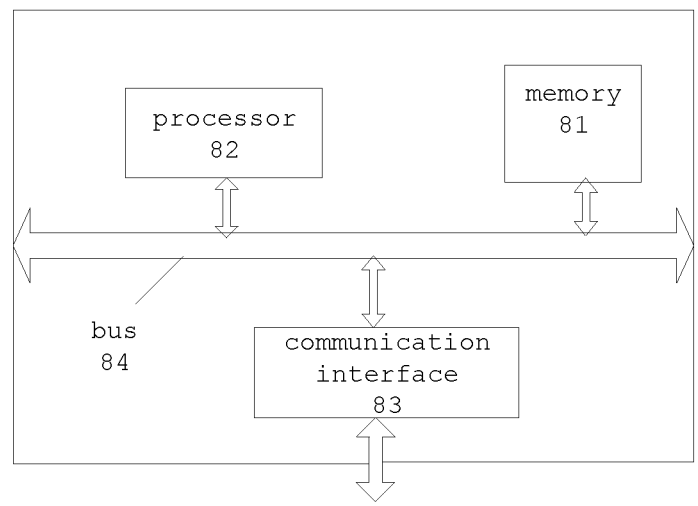
FIG. 8 is a schematic block diagram of a terminal according to other embodiments of the present disclosure.

FIG. 8 is a schematic block diagram of a terminal according to other embodiments of the present disclosure. As shown in FIG. 8, the apparatus can comprise a memory 81, a processor 82, a communication interface 83, and a bus 84. The memory 81 is configured to store instructions, the processor 82 is coupled to the memory 81, and the processor 82 is configured to implement, based on the instructions stored in the memory 81, the data multiplexing transmission method described above.

The memory 81 can be a high-speed RAM memory, a non-volatile memory, or the like, and the memory 51 can also be a memory array. The memory 81 can also be partitioned into blocks, and the blocks can be combined into virtual volumes according to a certain rule. The processor 82 can be a central processing unit (CPU), or an ASIC (Application Specific Integrated circuit), or one or more integrated circuits configured to implement the data multiplexing transmission method of the present disclosure.

According to a further aspect of the present disclosure, there is provided a computer-readable storage medium having thereon stored computer instructions which, when executed by a processor, implement the above method.

According to the data multiplexing transmission method, the base station, the terminal, and the storage medium provided in the above embodiments, the base station sends the URLLC service resource occupation information corresponding to the first terminal through the control channel, and the second terminal performs data transmission processing according to the URLLC service resource occupation information obtained by the listening, which provides the uplink eMBB and URLLC a resource multiplexing solution, solves the overlap between the eMBB and URLLC resources of different users, and improves the use efficiency of uplink transmission resources.

The present disclosure is described with reference to flowcharts and/or block diagrams of methods, devices (systems) and computer program products according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions can be provided to a processor of a general-purpose computer, special-purpose computer, embedded processor, or other programmable data processing device to produce a machine, such that the instructions, which are executed by the processor of the computer or other programmable data processing device, create means for implementing the functions specified in one or more flows of the flowcharts and/or one or more blocks of the block diagrams.

These computer program instructions can also be stored in a computer-readable memory capable of guiding the computer or other programmable data processing device to work in a specific manner, such that the instructions stored in the computer-readable memory produce an article of manufacture including instruction means which implement the functions specified in one or more flows of the flowcharts and/or one or more blocks of the block diagrams.

These computer program instructions can also be loaded onto the computer or other programmable data processing device to cause a series of operation steps to be performed on the computer or other programmable device to produce a computer-implemented processing, such that the instructions, which are executed on the computer or other programmable devices, provide steps configured to implement the functions specified in one or more flows of the flowcharts and/or one or more blocks of the block diagrams.

The description of the present disclosure has been presented for purposes of illustration and description, and is not intended to be exhaustive or limit the present disclosure to the form disclosed. Many modifications and variations are apparent to those of ordinary skill in the art. The embodiments were chosen and described in order to better illustrate the principles and practical applications of the present disclosure, and to enable those of ordinary skill in the art to understand the present disclosure and thus design various embodiments with various modifications suitable for a specific purpose.

What is claimed is:

1. A data transmission method, comprising:
a base station receiving a URLLC service request sent by a first terminal and allocating resources occupied by transmission of the URLLC service for the first terminal;
wherein: the first terminal and a second terminal support transmission and reception of data in eMBB and URLLC modes; before receiving the URLLC service request, the base station separately allocates time-frequency resources for transmitting enhanced mobile broadband (eMBB) uplink data for the first terminal and a second terminal and separately sends allocated time-frequency resource information to the first terminal and the second terminal; the eMBB service comprises video service; and the URLLC service comprises automatic driving service;
the base station generating a control command and broadcasting the control command through the control channel;
wherein: the control command carries URLLC service resource occupation information corresponding to the resources occupied by the transmission of the URLLC service; the URLLC service resource occupation information has therein carried a bitmap information; the number of bits contained in the bitmap information is equal to the number of all the resources required to be occupied for transmitting the URLLC service, wherein each resource corresponds to one bit; and the resources comprises: a PRB, a PRB group, a subcarrier, a sequence, a codeword, a symbol and a time slot; and
the second terminal performing eMBB uplink data transmission processing based on the URLLC service resource occupation information, when detecting the URLLC service resource occupation information sent on the control channel.

2. The method according to claim 1, further comprising:
the base station obtaining all the resources required to be occupied for transmitting the URLLC service, generating one bit for each resource correspondingly, and generating the bitmap information based on the bits.

3. The method according to claims 1, wherein
the control channel comprises: a group common physical downlink control channel (Group common PDCCH); and
the control command comprises: a Group common PDCCH control command.

4. A base station comprising:
a memory; and a processor coupled to the memory, which is configured to perform, based on instructions stored in the memory, the method according to claims 1.

5. A non-transitory computer-readable storage medium having thereon stored computer instructions which, when executed by a processor, implement the method according to claims 1.

6. A data transmission method, comprising:
a second terminal detecting a control command broadcast by a base station through a control channel;
wherein: a first terminal and the second terminal support transmission and reception of data in eMBB and URLLC modes; before receiving a URLLC service request sent by the first terminal, the base station separately allocates time-frequency resources for transmitting enhanced mobile broadband (eMBB) uplink data for the first terminal and a second terminal and separately sends allocated time-frequency resource information to the first terminal and the second terminal; the eMBB service comprises video service; the URLLC service comprises automatic driving service; the control command carries URLLC service resource occupation information corresponding to resources occupied by the transmission of the URLLC service allocated to a first terminal; the URLLC service resource occupation information has therein carried a bitmap information; the number of bits contained in the bitmap information is equal to the number of all the resources required to be occupied for transmitting the URLLC service, wherein each resource corresponds to one bit; and the resources comprises: a PRB, a PRB group, a subcarrier, a sequence, a codeword, a symbol and a time slot; and
the second terminal performing eMBB uplink data transmission processing based on the URLLC service resource occupation information when detecting the URLLC service resource occupation information sent on the control channel;
wherein the second terminal performing the eMBB uplink data transmission processing based on the URLLC service resource occupation information comprises:
the second terminal judging whether time-frequency resources for transmitting the eMBB uplink data overlap with time-frequency resources corresponding to the URLLC service resource occupation information based on the URLLC service resource occupation information; and
the second terminal cancelling transmitting the eMBB uplink data under the condition that time-frequency resources for transmitting the eMBB uplink data overlap with time-frequency resources corresponding to the URLLC service resource occupation information.

7. The method according to claim 6, the second terminal performing data transmission processing based on the service resource occupation information comprises:
the second terminal continuing transmitting the eMBB uplink data under the condition that time-frequency resources for transmitting the eMBB uplink data do not overlap with time-frequency resources corresponding to the URLLC service resource occupation information.

8. The method according to claims 6, wherein the control channel comprises:
a group common physical downlink control channel (Group common PDCCH); and
the control command comprises: a Group common PDCCH control command.

9. A terminal comprising:
a memory; and a processor coupled to the memory, which is configured to perform, based on instructions stored in the memory, the method according to claims 6.

10. A non-transitory computer-readable storage medium having thereon stored computer instructions which, when executed by a processor, implement the method according to claim 6.

* * * * *